(12) United States Patent
Teboulle et al.

(10) Patent No.: US 10,742,266 B2
(45) Date of Patent: Aug. 11, 2020

(54) DEVICE FOR TRANSPORTING LORA FRAMES ON A PL NETWORK

(71) Applicant: SAGEMCOM ENERGY & TELECOM SAS, Rueil Malmaison (FR)

(72) Inventors: Henri Teboulle, Rueil Malmaison (FR); Marc Le Gourrierec, Rueil Malmaison (FR); Franck Harnay, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 16/511,535

(22) Filed: Jul. 15, 2019

(65) Prior Publication Data

US 2020/0028540 A1 Jan. 23, 2020

(30) Foreign Application Priority Data

Jul. 18, 2018 (FR) ...................................... 18/56654

(51) Int. Cl.
*H04B 3/36* (2006.01)
*H04B 7/17* (2006.01)
(Continued)

(52) U.S. Cl.
CPC .............. *H04B 3/542* (2013.01); *H04B 3/58* (2013.01); *H04L 12/66* (2013.01); *H04L 67/02* (2013.01)

(58) Field of Classification Search
CPC ........... H04B 3/542; H04B 3/58; H04L 12/66; H04L 67/02; H01R 22/00; H04Q 9/00; G06Q 20/027
(Continued)

(56) References Cited

U.S. PATENT DOCUMENTS

| 6,900,737 B1 * | 5/2005 | Ardalan | .................. H04Q 9/00 340/870.02 |
| 2009/0125351 A1 * | 5/2009 | Davis, Jr. | ............. G06Q 20/027 705/79 |

(Continued)

FOREIGN PATENT DOCUMENTS

| CN | 107547521 A | 1/2018 |
| EP | 3122061 A1 | 1/2017 |

(Continued)

OTHER PUBLICATIONS

Nov. 22, 2018 Search Report issued in French Patent Application No. 1856654.

(Continued)

*Primary Examiner* — Phuong Phu
(74) *Attorney, Agent, or Firm* — Oliff PLC; R. Brian Drozd

(57) ABSTRACT

A device included in a communication system that includes a LoRa endpoint and a LoRa server. Each LoRa frame exchanged between the endpoint and the server has to pass through a meter and a data concentrator included in a first powerline communication network of a system for the automatic management of readings from meters. The meters are attached to at least one data concentrator via the first network. At least one of the meters implements a LoRa gateway that has a communication interface enabling it to exchange LoRa frames with the endpoint. The device is connected to each data concentrator by a second network and to the server by a third network. Each LoRa frame exchanged between the endpoint and the server (1) passes through the device and (2) is encapsulated in a frame according to a frame format that the server will exchange with a LoRa gateway.

7 Claims, 5 Drawing Sheets

(51) Int. Cl.
    *H04L 25/20*     (2006.01)
    *H04L 25/52*     (2006.01)
    *H04B 3/54*     (2006.01)
    *H04B 3/58*     (2006.01)
    *H04L 12/66*     (2006.01)
    *H04L 29/08*     (2006.01)

(58) Field of Classification Search
    USPC ................. 375/219, 220, 222, 211, 257, 258
    See application file for complete search history.

(56) References Cited

U.S. PATENT DOCUMENTS

2013/0094597 A1*   4/2013   Vijayasankar ......... H04B 3/542
                                                                                                              375/257
2017/0150239 A1*   5/2017   Davis ...................... G01R 22/00

FOREIGN PATENT DOCUMENTS

WO        2018/077790 A1     5/2018
WO        2018/119235 A1     6/2018

OTHER PUBLICATIONS

Nor et al; "Smart Traffic Light for Congestion Monitoring using LoRaWAN;" 2017 IEEE 8th Control and System Graduate Research Colloquium (ICSGRC 2017); pp. 132-137; Aug. 2017.
Li et al; "Research on Water Meter Reading System Based on LoRa Communication;" 2017 IEEE International Conference on Smart Grid and Smart Cities; pp. 248-251; Jul. 2017.

\* cited by examiner

| 51 | 52 |
|---|---|
| 53 ||
| 54 ||
| 55 ||
| 56 ||

Fig. 5

| 51 | 52 |
|---|---|
| 63 ||
| 64 ||
| 65 ||
| 66 ||

Fig. 6

| 71 |
|---|
| 63 |
| 64 |
| 65 |
| 66 |

Fig. 7

| 81 |
|---|
| 63 |
| 64 |
| 65 |
| 66 |

Fig. 8

| 91 | 92 |
|---|---|
| 63 ||
| 64 ||
| 65 ||
| 66 ||

Fig. 9

| 51 | 102 |
|---|---|
| 53 ||
| 54 ||
| 55 ||
| 56 ||

Fig. 10

DEVICE FOR TRANSPORTING LORA FRAMES ON A PL NETWORK

The present invention relates to a device and method for transporting frames sent by an endpoint over a low power wide area wireless network by means of a powerline communication network of a system for the automatic management of electricity meter readings.

With the recent appearance of the Internet of Things (IoT) a new type of network has appeared: Low Power Wide Area Networks (LPWANs). Among these LPWAN networks, mention can be made of networks based on the LoRa (long range) (registered trade mark) technology and networks from the company Sigfox.

A network based on LoRa technology (hereinafter referred to as "LoRa network") uses a protocol known as LoRaWAN. A LoRa network is composed of base stations or gateways generally placed at high points in order to cover a large geographical area. The gateways, hereinafter referred to as LoRa gateways, are able to detect messages sent in their zone by equipment or endpoints and to transfer them to at least one server ("LoRa network server (LNS)"), hereinafter referred to as an LNS server, which will process them.

In a conventional functioning of a LoRa network, an endpoint wishing to transmit a message (i.e. data) to the LNS server transmits this message in a frame, referred to as an uplink LoRa frame, in accordance with the LoRaWAN protocol. The uplink LoRa frame is transmitted in broadcast mode. This uplink LoRa frame is received by at least one LoRa gateway. Each LoRa gateway that has received the uplink LoRa frame decodes it and retransmits the message to the server in an HTTP (HyperText Transfer Protocol) request. If a plurality of LoRa gateways have received the uplink LoRa frame, the server receives a plurality of HTTP requests containing the message. The server must then designate, among the LoRa gateways that have received the uplink LoRa frame, the LoRa gateway to be used for relaying a response to the message contained in the uplink LoRa frame. The response is transmitted from the server to the designated LoRa gateway in an HTTP request, and then in unicast mode from the designated LoRa gateway to the endpoint in a downlink LoRa frame in accordance with the LoRaWAN protocol.

Although LPWAN networks are becoming more and more widespread, there exist zones outside the range of these networks. These zones do not then have access to the Internet of Things.

Other networks offer a much finer coverage of territories, in particular in developed countries. Electricity networks can in particular be thought of. Electricity networks, which originally were intended solely for transporting electricity, have developed latterly in order to become networks in which data can flow. Powerline communication networks for systems of the AMM (Automated Meter Management) type thus use infrastructures of the electricity networks to create a network known as a logic network. Among these logic networks, referred to as PL (PowerLine) networks, mention can be made of networks in accordance with the PRIME (PoweRline Intelligent Metering Evolution) specifications or the networks in accordance with the G3-PLC standard specified in ITU-T recommendation G.9903. In PL networks, communications are established between electricity meters, referred to as smart meters, and a device known as a data concentrator in order to allow in particular remote automated reading of electricity consumption measurements made by said smart meters. Hereinafter each smart electricity meter will simply be referred to as a meter. A plurality of data concentrators are typically geographically deployed in a PL network so as to distribute the load relating to the remote management of a multitude of meters. Each data concentrator is itself connected to the same centralised unit allowing management of the AMM system, which is managed by an operator of the electricity supply network to which said meters are connected.

As indicated by the acronym AMM, PL networks, for systems of the AMM type, are intended to transport metrology data coming from meters. No provision is made, neither in hardware terms nor in protocol terms, for transporting anything other than metrology data coming from meters. The electricity networks which, unlike LPWAN networks, cover territories finely, cannot therefore, at the present time, be used for transporting data coming from connected objects in zones not covered by the LPWAN networks.

It is desirable to overcome these drawbacks of the prior art. It is in particular desirable to propose a method and device making it possible to benefit from the coverage of a PL network for AMM systems in order to route to an LNS server data coming from connected objects out of range of an LPWAN network. The method and device must preferentially ensure retrocompatibility with existing systems and in particular with existing LNS servers. Since metrology data have priority on PL networks for AMM systems, the method proposed must moreover ensure that the transport of data coming from connected objects does not affect the transport of metrology data.

It is also desirable to provide a solution that is simple to implement at low cost.

According to a first aspect of the present invention, the present invention relates to a device for exchanging first frames, referred to as LPWAN frames, between an endpoint and a server, said endpoint being configured to exchange LPWAN frames with at least one gateway, referred to as an LPWAN gateway, by means of a first low power long range wireless network, and the server being configured to exchange LPWAN frames with LPWAN gateways, each LPWAN frame exchanged between the endpoint and the server having to pass through at least one meter and a data concentrator included in a second powerline communication network and forming a system for the automatic management of readings from a plurality of electricity meters, referred to as an AMM system, at least one meter in said AMM system implementing an LPWAN gateway and comprising a communication interface enabling it to exchange LPWAN frames with said endpoint by means of the first network. The device is connected to each data concentrator by means of a third network and to the server by means of a fourth network, and in that each LPWAN frame exchanged between said endpoint and the server passes through the device, each LPWAN frame exchanged between the device and the server being encapsulated in a second frame in accordance with a frame format that the server would exchange with an LPWAN gateway, and, when an LPWAN frame sent by the endpoint is received directly by a plurality of meters and by a plurality of data concentrators in the second network so that the device receives a plurality of copies of the LPWAN frame, the device is configured to transmit a single copy of the LPWAN frame to the server, said LPWAN frame being associated in the second frame with information representative of one of the meters that directly received the LPWAN frame, chosen by the intermediate system in accordance with a predetermined criterion.

According to a second aspect of the invention, the invention relates to a communication system comprising an endpoint and a server, said endpoint being configured to exchange LPWAN frames with at least one gateway, referred to as an LPWAN gateway, by means of a first low power long range wireless network, and the server being configured to exchange LPWAN frames with LPWAN gateways, each frame exchanged between the endpoint and the server having to pass through a meter and a data concentrator included in a second power line communication network of a system for the automatic management of readings from a plurality of electricity meters, referred to as meters, said meters in the plurality of meters being attached to at least one data concentrator via the second network, at least one meter in the plurality implementing an LPWAN gateway and comprising a communication interface enabling it to exchange LPWAN frames with said endpoint by means of the first network. The system comprises a device according to the first aspect.

According to a third aspect of the invention, the invention concerns a method for exchanging first frames, referred to as LPWAN frames, between an endpoint and a server, said endpoint being configured to exchange LPWAN frames with at least one gateway, referred to as an LPWAN gateway, by means of a first low power long range wireless network, and the server being configured to exchange LPWAN frames with LPWAN gateways, each LPWAN frame exchanged between the endpoint and the server having to pass through at least one meter and a data concentrator connected together by a second powerline communication network and forming a system for the automatic management of readings from a plurality of electricity meters, at least one meter implements an LPWAN gateway and comprises a communication interface enabling it to exchange LPWAN frames with said endpoint by means of the first network. The method is executed by an intermediate device connected to each data concentrator by means of a third network and to the server by means of a fourth network so that each LPWAN frame exchanged between said endpoint and the server passes through the intermediate device, each LPWAN frame exchanged between the intermediate device and the server being encapsulated in a second frame in accordance with a frame format that the server would exchange with an LPWAN gateway, and comprises: receiving one or more copies of the same LPWAN frame sent by the endpoint from a plurality of data concentrators, the LPWAN frame having been received directly by a plurality of meters; and transmitting a single copy of the LPWAN frame to the server, said LPWAN frame being associated in the second frame with information representative of one of the meters that directly received the LPWAN frame, chosen by the intermediate system in accordance with a predetermined criterion.

According to one embodiment, the predetermined criterion consists of choosing the first copy of the LPWAN frame received or randomly a copy of the LPWAN frame or a copy of the LPWAN frame received with the best quality by a meter in the second network.

According to one embodiment, when, following the transmission of an LPWAN frame to the server, said LPWAN frame having been received directly by a plurality of meters, the intermediate device receives a response frame intended for the endpoint from the server, the server having inserted in the response frame an identifier of a meter chosen by the server for relaying said response frame to the endpoint, the method comprises: determining the meter in the plurality of meters that received the LPWAN frame with the best quality; and inserting an identifier of the meter determined in the response frame in place of the identifier inserted by the server.

According to one embodiment, each LPWAN frame included in a second frame is encapsulated to the JSON format.

According to a fourth aspect of the invention, the invention relates to a computer program comprising instructions for the implementation, by a device, of the method according to the third aspect when said program is executed by a processor of said device.

According to a fifth aspect of the invention, the invention relates to storage means storing a computer program comprising instructions for the implementation, by a device, of the method according to the first aspect when said program is executed by a processor of said device.

The features of the invention mentioned above, as well as others, will emerge more clearly from a reading of the following description of an example embodiment, said description being given in relation to the accompanying drawings, among which:

FIG. 5 illustrates schematically an encapsulation of an uplink LoRa frame in a G3-PLC frame;

FIG. 6 illustrates schematically an encapsulation of an uplink LoRa frame in an HTTP frame;

FIG. 7 illustrates schematically an encapsulation in the JSON format of an uplink LoRa frame in an HTTP frame;

FIG. 8 illustrates schematically an encapsulation in the JSON format of a downlink LoRa frame in an HTTP frame;

FIG. 9 illustrates schematically an encapsulation of a downlink LoRa frame in an HTTP frame;

FIG. 10 illustrates schematically an encapsulation of a downlink LoRa frame in a G3-PLC frame.

The invention is described in a context of a PL network of an AMM system in which the communications are based on the G3-PLC protocol. Moreover, as we shall see subsequently, some meters in the PL network comprise a communication interface making it possible to communicate on an LPWAN network of the LoRa type using frames in accordance with the LoRaWAN protocol. The invention could just as well be used in another context. The PL network of the AMM system could just as well use communications based on the PRIME specifications. Moreover, the LPWAN network could be a Sigfox network.

Figure 1:
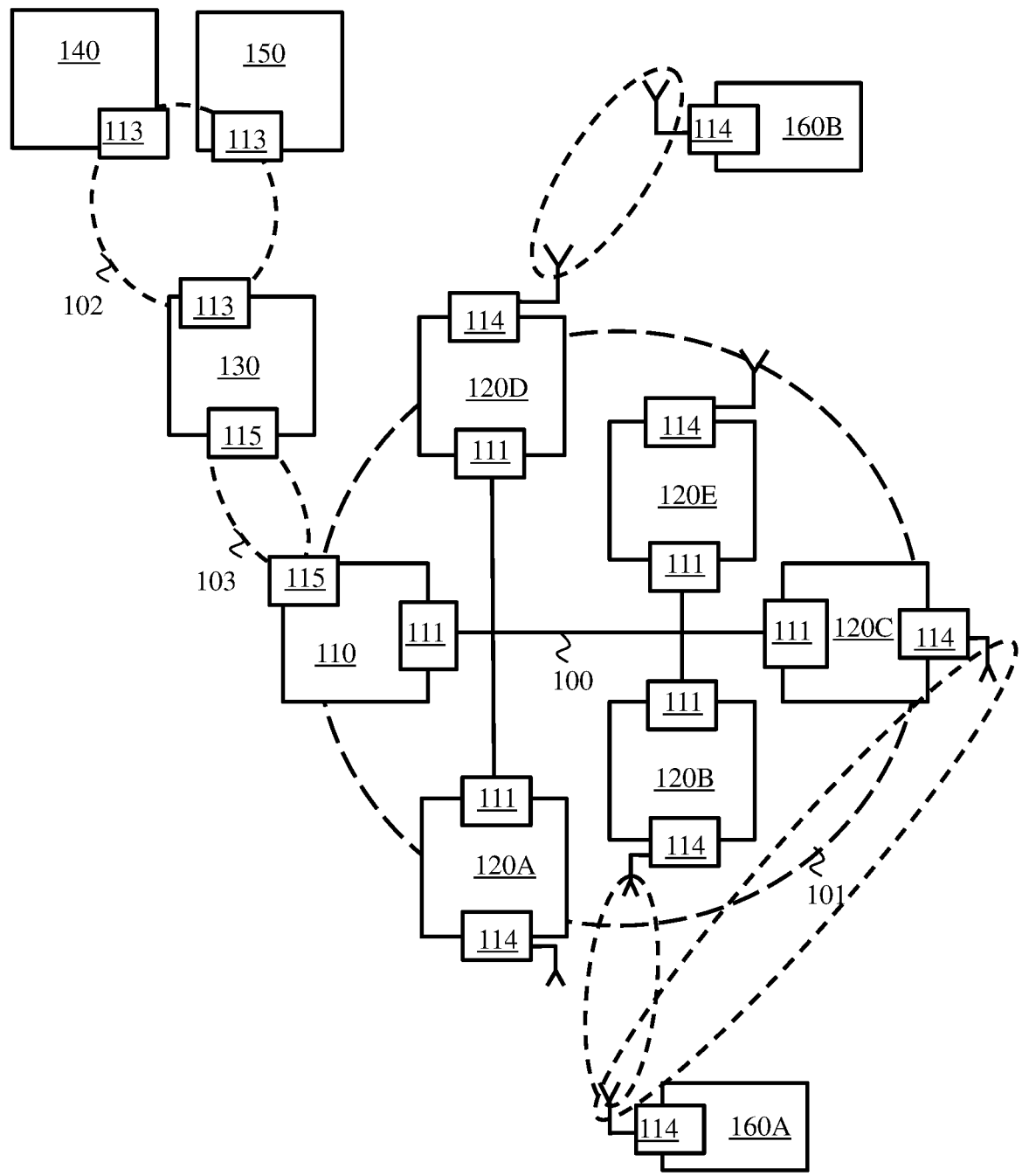
FIG. 1 illustrates schematically an example of an AMM system in which the invention is implemented.

FIG. 1 illustrates schematically an example of an AMM system in which the invention is implemented.

The AMM system in FIG. 1 comprises a termination system, referred to as an HES (head-end system) 140. The HES system 140 receives information on electrical consumption measurements collected by a plurality of meters 120A, 120B, 120C, 120D and 120E (denoted 120A-E) and processes it. To enable said meters to transmit said information to the HES system 140, PL communications are established between each of said meters and a data concentrator 110. The communication system typically comprises a plurality of data concentrators 110, only one being shown in FIG. 1. A plurality of meters are connected logically to each data concentrator 110.

A PL network 101 is thus formed between each data concentrator 110 and the plurality of meters that is connected thereto. This PL network 101 relies on an electrical distribution network 100 (i.e. physical network) serving to supply electricity to the electrical installations that said meters 120A-E are responsible for monitoring. Each meter 120A-E thus comprises a PL communication interface 111 for communicating via the PL network 101. Likewise, each data concentrator 110 comprises such a PL communication interface 111 for communicating via the PL network 101. According to an example embodiment, the PL network 101 is in accordance with the G3-PLC protocol.

In FIG. 1, each meter 120A-E comprises a communication interface 114 with an LPWAN network of the LoRa type, referred to as a LoRa network. The LoRa network enables each meter 120A-E to communicate with endpoints situated within range of said meters, each endpoint being connected to the LoRa network by means of the same communication interface 114. In FIG. 1, two endpoints of the connected object type 160A and 160B are shown. The meters 120A-E and the endpoints 160A and 160B communicate in accordance with the LoRaWAN protocol. In FIG. 1, each uplink LoRa frame sent in broadcast mode by the endpoint 160A is received by the meters 120B and 120C. Each uplink LoRa frame sent in broadcast mode by the endpoint 160B is received by the meter 120D.

Each uplink LoRa frame sent by an endpoint is intended for a server 150, referred to as a LoRa network server (LNS) or LNS server. The LNS server 150 receives the uplink LoRa frames collected by the data concentrator 110 and processes them.

Placed between each data concentrator 110 and the HES system 140 and the LNS server 150, the system in FIG. 1 comprises an intermediate system 130, referred to as a retransmission network system or FNS (forwarding network server) system. Each frame exchanged between each data concentrator 110 and the HES system 140 or the LNS server 150 passes through the FNS system 130.

To make it possible to relay the information transmitted by the meters 120A-E to the HES system 140, each data concentrator 110 further comprises an interface 115 for communication with a communication network 103, to which the FNS system 130 is also connected.

The FNS system 130 thus comprises an interface 115 for communication via the communication network 103 enabling it to communicate with a plurality of data concentrators 110. The communication network 103 is preferentially a network of the IP (Internet Protocol) type, as defined in the normative document RFC 791, such as the internet. In one embodiment, the communications between each data concentrator 110 and the FNS system 130 use HTTP requests.

The HES system 140 and the LNS server 150 thus comprise an interface 113 for communication via a communication network 102 enabling them to communicate with the FNS system 130. The FNS system 130 thus comprises an interface 113 for communication via the communication network 102 enabling it to communicate with the HES system 140 and the LNS server 150. The communication network 102 is preferentially an IP network. In one embodiment, the communications between the HES system 140 (or respectively the LNS server 150) and the FNS system 130 use HTTP requests.

The FNS system 130 is therefore connected to each data concentrator 110 by means of the network 103 and to the LNS server 150 by means of the network 102.

In the system in FIG. 1, each meter having a communication interface 114 implements a LoRa gateway and thus fulfils a role similar to a LoRa gateway in a conventional LoRa network vis-à-vis endpoints. However, as we shall see hereinafter in relation to FIGS. 2 and 4, in order to avoid overloading the AMM system with LoRa requests, not all the uplink LoRa requests received by a meter 120A-E are transferred to the FNS system 130.

Each entity in the system in FIG. 1, whether a data concentrator 110, a meter 120A-E, the FNS system 130, the HES system 140 or the LNS server 150, comprises a processing module 30 (not shown) enabling these entities to contribute to implementation of the invention.

Figure 2:
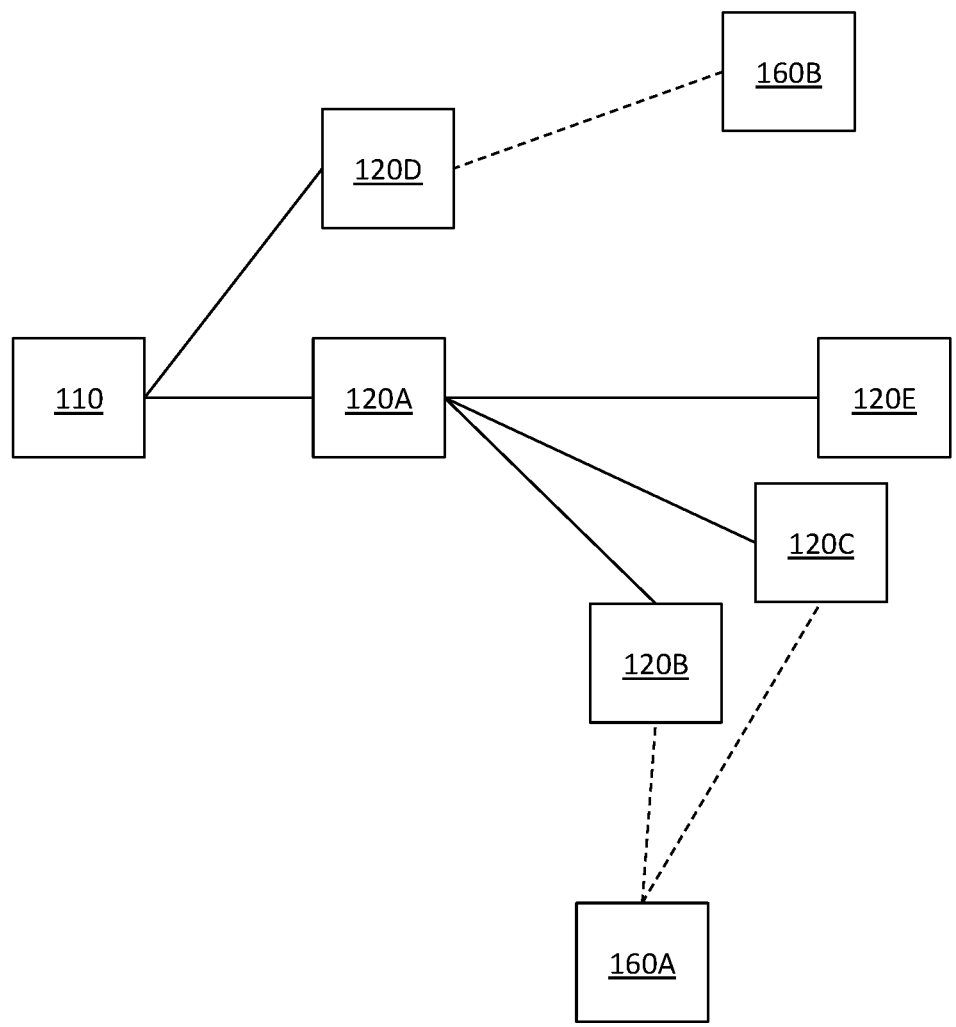
FIG. 2 illustrates schematically a representation of a logic network corresponding to a physical network illustrated in the previous figure.

FIG. 2 illustrates schematically a representation of a logic network corresponding to the PL network used on the electrical network 100 illustrated in FIG. 1.

As mentioned in relation to FIG. 1, each meter 120A-E is connected to a data concentrator 110. On the other hand, from a logic point of view, some meters, such as the meters 120A and 120D, are connected directly to the data concentrator 110, whereas other meters, such as the meters 120B, 120C and 120E, are connected indirectly to the data concentrator 110 by means of another meter. Thus the meters 120A and 120D can communicate directly with the data concentrator 110. On the other hand, each frame in accordance with the G3-PLC standard, referred to as a G3-PLC frame hereinafter, sent by the meters 120B, 120C and 120E must pass through the meter 120A in order to reach the data concentrator 110. A parent-child hierarchy is therefore created between some meters. For example, the meter 120A is a parent vis-à-vis the meters 120B, 120C and 120E, which are themselves children of the meter 120A.

As seen in relation to FIG. 1, each uplink LoRa frame sent by the endpoint 160A is received by the meters 120B and 120C. Consequently, when an uplink LoRa frame is sent by the endpoint 160A, it is received by the meter 120B, which relays it to the meter 120A, and by the meter 120C, which also relays it to the meter 120A. The same uplink LoRa frame is therefore received twice by the meter 120A. In a conventional LoRa network, each LoRa gateway receiving an uplink LoRa frame relays it to an LNS server with which it is connected. A LoRa gateway is not concerned to know whether one or more other LoRa gateways have relayed the same uplink LoRa frame. In a conventional LoRa network, a LoRa gateway receiving an uplink LoRa frame has no means of knowing whether this uplink LoRa frame has been received and relayed to the LNS server by another LoRa gateway.

As can be seen in FIG. 2, the situation is different when the LoRa gateway is integrated in a meter such as the meters 120A-E. This is because some meters, such as the meter 120A, because of the organisation of the meters in the AMM system in a parent-child hierarchy, receive the same frame several times. By analysing the uplink LoRa frames that it receives, a meter can know that it is receiving the same uplink LoRa frame several times.

Figure 3:
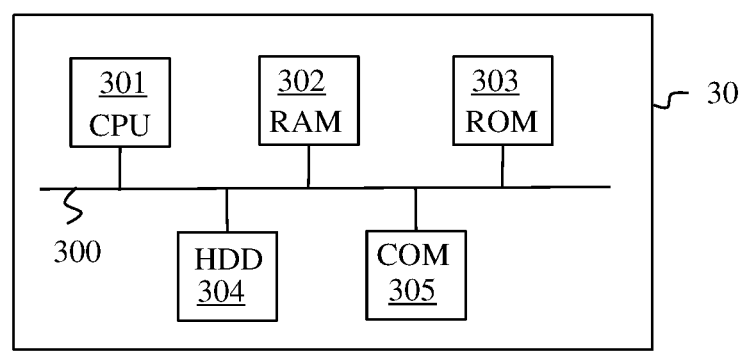
FIG. 3 illustrates schematically an example of hardware architecture of a processing module.

FIG. 3 illustrates schematically an example of hardware architecture of the processing module 30.

The processing module 30 then comprises, connected by a communication bus 300: a processor or CPU 301; a random access memory RAM 302; a read only memory ROM 303; a storage unit or a storage medium reader, such as an SD card reader 304; a set of communication interfaces 305 enabling the processing module 30 to communicate with other entities in the system in FIG. 1.

When the processing module 30 is included in a meter 120A-E, the set of communication interfaces 305 comprises the interface 111 for communication to the PL network 101 and the interface 114 for communication to an LPWAN network.

When the processing module 30 is included in a data concentrator 110, the set of communication interfaces 305 comprises the interface 111 for communication to the PL network 101 and the interface 115 for communication to the communication network 103.

When the processing module 30 is included in the FNS system 130, the set of communication interfaces 305 comprises the interface 113 for communication to the network 102 and the interface 115 for communication to the network 103.

When the processing module 30 is included in the HES system 140, the set of communication interfaces 305 comprises the interface 113 for communication to the network 102.

When the processing module 30 is included in the LNS server 150, the set of communication interfaces 305 comprises the interface 113 for communication to the network 102.

When the processing module 30 is included in the endpoint 160A or 160B, the set of communication interfaces 305 comprises the interface 114 for communication to the LPWAN network.

The processor 301 is capable of executing instructions loaded in the RAM 302 from the ROM 303, from an external memory (not shown), from a storage medium, such as an SD card, or from a communication network. When the entity (i.e. the data concentrator 110, a meter 120A-E, the FNS system 130, the HES system 140, the LNS server 150, or an endpoint 160A or 160B) is powered up, the processor 301 is capable of reading instructions from the RAM 302 and executing them. These instructions form a computer program causing the implementation by the processor 301 of a method described in relation to FIG. 4.

Figure 4:
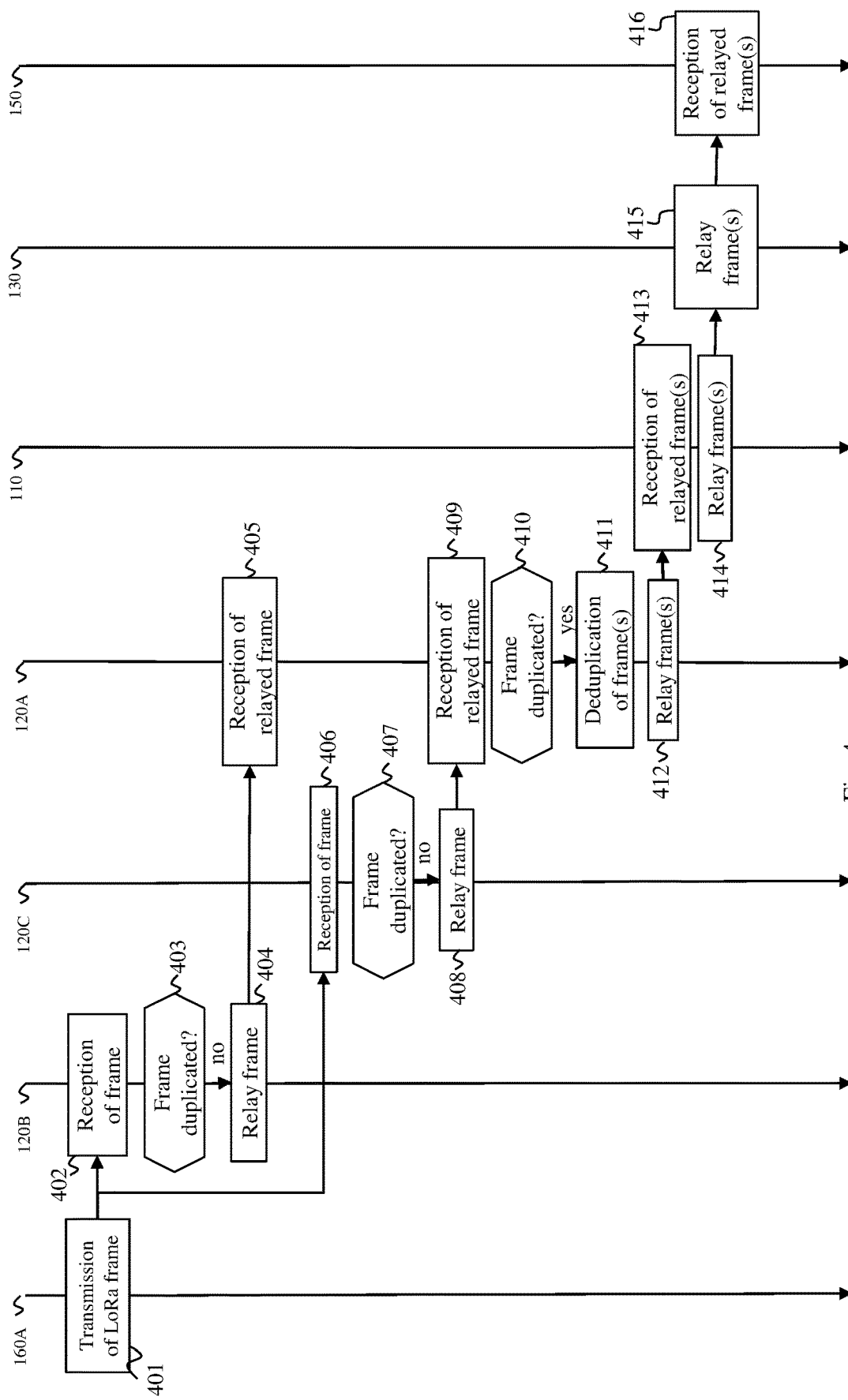
FIG. 4 illustrates schematically an example of implementation in an AMM system of a method for routing frames sent by an endpoint over an LPWAN network.

All or part of the method described in relation to FIG. 4 can be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

FIG. 4 illustrates schematically an example of implementation, in an AMM system, of a method for routing frames sent by endpoints over an LPWAN network.

In FIG. 4 we take the example of an uplink LoRa frame sent by the endpoint 160A. A similar implementation would have been obtained by the uplink LoRa frame sent by the endpoint 160B.

In a step 401, the processing module 30 of the endpoint 160A causes the sending of an uplink LoRa frame. This uplink LoRa frame is transmitted in broadcast mode by means of the communication interface 114 of the endpoint 160A. The uplink LoRa frame comprises an identifier of the endpoint 160A in the form of an address DevAddr.

In a step 402, the processing module 30 of the meter 120B detects the reception by the meter 120B, on its communication interface 114, of the uplink LoRa frame.

Although these two frames are identical, hereinafter we refer to the uplink LoRa frame when it is sent by the endpoint 160A as the sent frame and the uplink LoRa frame when it is received by a meter, for example here the meter 120B, as the received frame.

In a step 403, in order to decide whether the frame received by the meter 120B must be relayed, the processing module 30 of the meter 120B determines whether this frame meets a predetermined criterion.

In one embodiment, referred to as the non-time-delayed mode, the predetermined criterion consists of systematically selecting the frame corresponding to said sent frame received first by the meter 120B.

In one embodiment, referred to as the first time-delayed mode, during step 403, the processing module 30 waits for a predetermined period TEMPO following the first reception of a frame corresponding to the same sent frame. The predetermined period TEMPO is for example 200 ms. In this embodiment, the predetermined criterion consists of randomly selecting one frame among the frames corresponding to said sent frame received by the meter 120B during the predetermined period TEMPO.

In one embodiment, referred to as the second time-delayed mode, during step 403, the processing module 30 waits for the predetermined period TEMPO following the first reception of a frame corresponding to the same sent frame. In this embodiment, the predetermined criterion consists of selecting the frame offering a best quality of reception among the frames corresponding to said sent frame that were received during the predetermined period TEMPO.

The frames that do not correspond to the predetermined criterion are systematically rejected.

In the case of FIG. 4, the meter 120B receives only once the frame sent by the endpoint 160A. Consequently, whatever the embodiment, the only frame received is selected to be relayed.

In a step 404, the processing module 30 of the meter 120B encapsulates the received frame in a G3-PLC frame and transmits this G3-PLC frame in the direction of the data concentrator 110. The meter 120B therefore transmits the G3-PLC frame to the meter 120A. The G3-PLC frame sent by the meter 120B is hereinafter referred to as the first G3-PLC frame.

FIG. 5 illustrates schematically an encapsulation of an uplink LoRa frame in a G3-PLC frame.

The frame depicted in FIG. 5 is therefore a frame in accordance with the G3-PLC standard. This G3-PLC frame comprises, in a subpart 56, a G3-PLC header, in a subpart 55 a 6LowPAN (IPv6 Low power Wireless Personal Area Networks) header, in a subpart 54 an IPv6 (Internet Protocol version 6) header and in a subpart 53 a UDP (User Datagram Protocol) header. The G3-PLC frame further comprises a first subpart 51 comprising the encapsulated uplink LoRa frame and a second subpart 52. The subparts 51 and 52 form a useful part of the G3-PLC frame. The second subpart 52 is intended to receive identifiers of each meter that directly (i.e. through a network interface 114) received the encapsulated LoRa frame. In one embodiment, each LoRa gateway implemented by a meter has an IP (Internet Protocol) address. The identifier of a meter that has received the uplink LoRa frame is in this case the IP address of the LoRa gateway implemented by this meter.

In these embodiments, during step 404, the meter 120B stores the identifier of the meter 120B in the subpart 52.

In one embodiment, in addition to storing an identifier of each meter that received the uplink LoRa frame, the subpart 52 stores, for each meter that received the uplink LoRa frame, information representing a quality of reception of said uplink LoRa frame by said meter. The quality information is for example a signal-to-noise ratio (SNR) and/or a received signal strength indication (RSSI).

In this embodiment, the subpart 52 comprises information representing the quality of reception by the meter 120B of the frame sent by the endpoint 160A.

In a step 406, the processing module 30 of the meter 120C detects a reception by the meter 120C, on its communication interface 114, of the frame sent by the endpoint 160A.

In a step 407, the processing module 30 of the meter 120C applies a step identical to step 403. The result of step 407 is then identical to the result of step 403 since the processing module 30 of the meter 120C selects the only received frame and relays this frame in a step 408 in the direction of the data concentrator 110 in a G3-PLC frame. The G3-PLC frame sent by the meter 120C is hereinafter referred to as the second G3-PLC frame.

The second G3-PLC frame repeats the frame format described in relation to FIG. 5. In the subpart 51, it comprises the same uplink LoRa frame as the first G3-PLC frame. In the subpart 52, it comprises the identifier of the meter 120C. In one embodiment, the subpart 52 also comprises information representing a quality of reception of said uplink LoRa frame by the meter 120C.

In steps 405 and 409, the processing module 30 of the meter 120A receives respectively the first G3-PLC frame and the second G3-PLC frame on its communication interface 111.

In a step 410, the processing module 30 of the meter 120A applies a step identical to steps 403 and 407. However, whereas steps 403 and 407 were executed in a context in which the meters 120B and 120C each received only one frame corresponding to the sent frame, during step 410 the meter 120A receives two frames corresponding to the sent frame.

In the case of non-time-delayed mode, the processing module 30 of the meter 120A selects, in a step 411, the first received frame corresponding to the sent frame as soon as this frame is received. The frame received during step 405 is therefore selected to be relayed.

In the case of the first time-delayed mode, the processing module 30 of the meter 120A randomly selects, in step 411, one frame among the frames corresponding to the sent frame that it has received. For example, the processing module 30 of the meter 120A selects the frame received during step 405 (i.e. the first G3-PLC frame).

In the case of the second time-delayed mode, the processing module 30 of the meter 120A, during step 411, selects the frame offering the best quality of reception among the frames corresponding to the sent frame that it has received. To do this, the processing module 30 of the meter 120A uses the information representing a quality of reception contained in the subpart 52 of each G3-PLC frame received (i.e. the first and second G3-PLC frames). For example, the processing module 30 of the meter 120A selects the frame received during step 409 (i.e. the second G3-PLC frame).

In a step 412, the processing module 30 of the meter 120A causes the relaying of the selected frame to the data concentrator 110. The relayed frame complies with the frame format described in relation to FIG. 5. During step 412, the relayed frame comprises the uplink LoRa frame sent by the endpoint 160A during step 401 in its subpart 51. Moreover, during step 412, the relayed frame comprises, in its subpart 52, the identifier of each meter that directly received the uplink LoRa frame (here this corresponds to the meters 120B and 120C). In one embodiment, the subpart 52 also comprises, for each meter that directly received the uplink LoRa frame sent by the endpoint 160A, information representing a quality of reception of said frame by the meter. In the example in FIG. 4, the relayed G3-PLC frame comprises information representing the quality of reception of the uplink LoRa frame by the meter 120B and information representing the quality of reception of the uplink LoRa frame by the meter 120C.

In a step 413, the processing module 30 of the data concentrator 110 detects that the data concentrator 110 has received a G3-PLC frame. During step 413, the useful part of the G3-PLC frame is extracted and encapsulated in an HTTP frame.

FIG. 6 illustrates schematically an encapsulation of an uplink LoRa frame in an HTTP frame.

The HTTP frame comprises, in a subpart 66 for example, an Ethernet header, in its subpart 65 an IP header (IPv4 or IPv6), in a subpart 64 a TCP (transmission control protocol) header and in a subpart 63 an HTTP header. In a useful part of the HTTP frame there are the subpart 51 and the subpart 52 comprising in particular the identifier of each meter that relayed the uplink LoRa frame (that is to say comprising, for each meter that relayed the uplink LoRa frame, the IP address of the LoRa gateway implemented by said meter). In a variant, it is possible to use the TLS (Transport Layer Security) protocol with HTTP, which corresponds to HTTPS (HyperText Transfer Protocol Secure), so as to transmit in secure manner.

In a step 414, the processing module 30 of the data concentrator 110 transmits the HTTP frame in the direction of the FNS system 130.

The data concentrator 110 is conventional. It merely relays the useful part of a G3-PLC frame in an HTTP frame to the system 130, without being concerned with the content of this useful part. The data concentrator 110 cannot distinguish between a useful part containing metrology data coming from a meter or data in accordance with the LoRaWAN protocol.

In a step 415, the processing module 30 of the FNS system 130 detects that the FNS system 130 has received an HTTP frame. During step 415, the processing module 30 of the FNS system 130 determines, for the HTTP frame received, whether the HTTP frame contains metrology data coming from a meter or whether it contains data in accordance with the LoRaWAN protocol. To do this, the processing module 30 of the FNS system 130 determines whether the useful part of the HTTP frame contains subparts 51 and 52.

When the HTTP frame comprises metrology data, the useful part of the HTTP frame is extracted and encapsulated in a new HTTP frame that is transmitted in the direction of the HES system 130.

When the HTTP frame comprises subparts 51 and 52, the processing module 30 of the FNS system 130 transmits the information contained in the uplink LoRa frame in an HTTP frame to the LNS server 150. However, the LNS server 150 is a conventional LNS server intended to function in a conventional LoRa network and therefore to receive HTTP frames comprising uplink LoRa frames coming from conventional LoRa gateways. The FNS system 130 must therefore transmit to the LNS server 150 HTTP frames conforming to what a conventional LoRa gateway would have transmitted. To do this, the FNS system 130 uses a data encapsulation format understood by all the LNS servers currently used, such as the JSON (JavaScript Object Notation) format described in the document "RFC7159: The JavaScript Object Notation (JSON) Data Interchange Format". In one embodiment, the uplink LoRa frame included in the subpart 51 is encapsulated in a container conforming to the JSON format. In another embodiment, the data included in the uplink LoRa frame included in the subpart 51 are extracted from the uplink LoRa frame, represented in the JSON format, and inserted in the HTTP frame to be transmitted to the LNS server 150. For both embodiments, we shall state hereinafter that the uplink LoRa frame is encapsulated in the JSO format.

In a conventional LoRa network, a LoRa gateway relaying an uplink LoRa frame coming from an endpoint to an LNS server in an HTTP frame inserts an identifier for recognising it, such as its IP address, in the HTTP frame. When a plurality of LoRa gateways relay the same uplink LoRa frame to an LNS server, the LNS server uses the identifier of each LoRa gateway that effected the relay in order to designate the LoRa gateway that is to relay a downlink LoRa frame intended for the endpoint originating the uplink frame.

In the example in FIG. 4, the FNS system 130 receives an HTTP frame comprising, in the subpart 51, an uplink LoRa frame, and in the subpart 52 an identifier of each meter that directly received the uplink LoRa frame from the endpoint 160A, that is to say an identifier of the meters 120B and 120C. In one embodiment, the subpart 52 also comprises, for each meter that directly received the uplink LoRa frame, information representing the quality of reception of said uplink LoRa frame by said meter.

In order to conform to the HTTP frames that would transmit a conventional LoRa gateway to the LNS server 150, each HTTP frame generated by the FNS system 130 can comprise only one meter identifier, this identifier being understood by the LNS server 150 as a LoRa gateway identifier. The processing module 30 of the FNS system 130 therefore chooses one of the identifiers that it has received in the subpart 52, which amounts to choosing the meter having this identifier.

In one embodiment, the module 30 of the FNS system 130 randomly chooses an identifier among the identifiers received in the subpart 51 of the HTTP frame received during step 415.

In one embodiment, when the subpart 52 comprises information representing the quality of reception for each meter that directly received the uplink LoRa frame, the module 30 of the FNS system 130 chooses the identifier received in the subpart 51 of the HTTP frame received during step 415 corresponding to the best information representing the quality of reception.

FIG. 7 illustrates schematically an encapsulation to the JSON format of an uplink LoRa frame in an HTTP frame.

The HTTP frame shown in FIG. 7 contains the subparts 63, 64, 65 and 66 already explained. The HTTP frame also comprises a subpart 71. The subpart 71 comprises the uplink LoRa frame included in the subpart 51 encapsulated in the JSON format. Moreover, the subpart 71 comprises the identifier of the meter that directly received the uplink LoRa frame. As seen above, this identifier is the IP address of the LoRa gateway implemented by said meter. In the example in FIG. 4, this uplink LoRa frame is the one that was selected during step 411.

In a step 416, the processing module of the LNS server 150 detects that the LNS server 150 has received the HTTP frame sent during step 415 and processes this HTTP frame.

In a conventional LoRa network, the message exchanges between an endpoint and an LNS server are bidirectional. An LNS server may for example acknowledge an uplink LoRa frame. To do this, as seen above, if a plurality of LoRa gateways have received the same uplink LoRa frame, the LNS server must designate, among the LoRa gateways that received the uplink LoRa frame, the LoRa gateway to be used for relaying a response to the message contained in the uplink LoRa frame. The response is transmitted from the LNS server to the designated LoRa gateway in an HTTP request, and then in unicast mode, from the designated LoRa gateway to the endpoint in a downlink LoRa frame in accordance with the LoRaWAN protocol.

In the context of the invention, the presence of the FNS system 130 makes it possible to mask the passing of the uplink LoRa frame by the AMM system to the LNS server 150. From the point of view of the LNS server 150, the HTTP frame received during step 416 was transmitted by a conventional LoRa gateway following reception by said conventional LoRa gateway of an uplink LoRa frame coming from the endpoint 160A. The LNS server 150 does not know that the uplink LoRa frame has been received by at least one meter implementing a LoRa gateway. The LNS server 150 reacts to the reception of the HTTP frame by means of the FNS system 130 in the same way as if it had received this HTTP frame from a conventional LoRa gateway. However, because of the elimination of the uplink LoRa frames duplicated between the meters and the FNS system 130, everything happens as if the uplink LoRa frame transmitted by the endpoint 160A had been relayed by only one LoRa gateway. From the point of view of the LNS server 150, this LoRa gateway is the one the identifier of which is indicated in the subpart 71 of the HTP frame received during step 416.

In one embodiment, the processing module 30 of the LNS server 150 designates the meter the identifier of which appears in the subpart 71 of the HTTP frame received during step 416. From this designation, each frame generated by the LNS server 150 and intended for the endpoint 160A will pass through the meter the identifier of which appears in the subpart 71 of the HTTP frame received during step 416.

Hereinafter, we assume that the uplink LoRa frame sent during step 401 by the endpoint 160A is a join request frame. In this case, the method described in relation to FIG. 4 is a start of a connection procedure corresponding to a join request phase.

During step 416, the LNS server 150 therefore receives a join request frame in the subpart 71 of at least one HTTP frame.

Following the reception of the join request frame, the LNS server 150 responds with a join accept frame.

Figure 11:
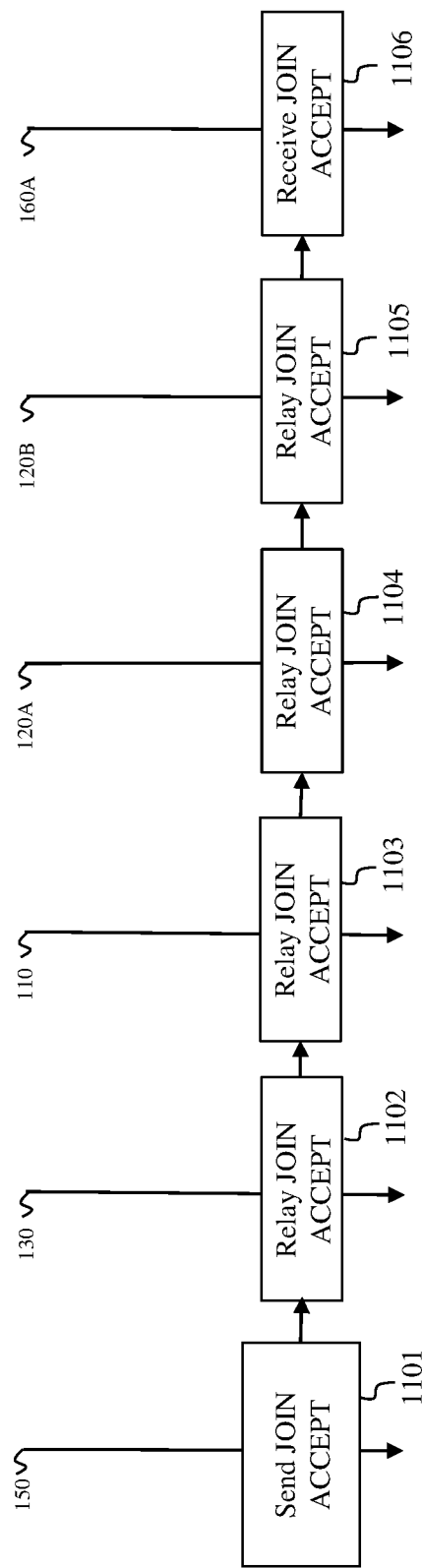
FIG. 11 illustrates schematically a connection authorisation procedure suited to the invention.

FIG. 11 illustrates schematically a join accept procedure.

In a step 1101, the processing module of the LNS server 150 generates a downlink LoRa frame containing a join acceptance, referred to as a join accept frame, intended for the device 160A, encapsulates the join accept frame in an HTTP frame in the JSON format and causes the transmission of the HTTP frame by the LNS server 150 to the FNS system 130.

FIG. 8 illustrates schematically an encapsulation of a downlink LoRa frame in an HTTP frame in the JSON format.

The HTTP frame in FIG. 8 contains the subparts 63, 64, 65 and 66. A subpart 81 comprises the join accept frame and the identifier of the designated meter encapsulated in the JSON format. In the example in FIG. 11, this is the meter 120B. In addition, the subpart 81 comprises a required time of sending of the downlink LoRa frame by the designated meter (i.e. the meter 120B), this time also being encoded to the JSON format. This sending time is a relative time with respect to the time of reception of an uplink LoRa frame by the designated meter.

In a step 1102, the FNS system 130 receives the HTTP frame encapsulating the join accept frame in the JSON format. During step 1102, the processing module 30 of the FNS system 130 extracts from the HTTP frame the join accept frame, the identifier of the designated meter and the required time of sending of the downlink LoRa frame. The processing module 30 of the FNS system 130 next inserts the join accept frame, the identifier of the designated meter and the required time of sending in the new HTTP frame described below in relation to FIG. 9.

FIG. 9 illustrates schematically an encapsulation of a downlink LoRa frame in an HTTP frame.

The HTTP frame in FIG. 8 contains the subparts 63, 64, 65 and 66. The subpart 91 comprises the join accept frame. A subpart 92 comprises the identifier of the designated meter and the required time of sending of the downlink LoRa frame by the designated meter.

Thus, whereas the HTTP frame generated by the LNS server 150 is a conventional HTTP frame that a conventional LoRa gateway is capable of processing, the HTTP frame generated by the FNS system 130 is specifically defined for a transmission of a downlink LoRa frame to a data concentrator.

During step 1102, the FNS system 130 transmits the HTTP frame to the data concentrator 110.

In a step 1103, the data concentrator 110 receives the HTTP frame. During step 1103, the processing module 30 of the data concentrator 110 extracts the useful part of the HTTP frame (i.e. the subparts 51 and 92) and forms a G3-PLC frame using this useful part.

FIG. 10 illustrates schematically an encapsulation of a downlink LoRa frame in a G3-PLC frame.

The G3-PLC frame contains the subparts 53, 54, 55, and 56. The subpart 51 comprises the downlink LoRa frame. A subpart 102 comprises the required time of sending of the downlink LoRa frame by the designated meter indicated in the subpart 92.

During step 1103, the processing module 30 of the data concentrator 110 reads the address of the designated meter in the subpart 92 and determines that, in order to reach the designated meter (i.e. the meter 102B), it must transmit the G3-PLC frame that it has formed to the meter 120A. The processing module 30 of the data concentrator 110 next causes the sending of the G3-PLC frame to the meter 120A.

In a step 1104, the meter 120A receives the G3-PLC frame. During step 1104, the meter 120A relays this frame in the direction of the meter 120B.

In a step 1105, the processing module 30 of the meter 120B detects that the meter 120B has received the G3-PLC frame and extracts the downlink LoRa frame from the G3-PLC frame. The processing module 30 of the meter 120B awaits reception of an uplink LoRa frame from the endpoint 160A. When the processing module 30 of the meter 120B detects reception of an uplink LoRa frame, it notes the time of reception of this uplink LoRa frame, adds the value of the required time of sending contained in the G3-PLC frame received during step 1105 to the time of reception in order to obtain an actual time of transmission, and transmits the downlink LoRa frame to the endpoint 160A at the actual time of transmission thus calculated.

In a step 1106, the endpoint 160A receives the downlink LoRa frame.

In the example in FIGS. 4 and 11, the uplink LoRa frame is a request to join the LoRa network and the downlink LoRa frame is a join acceptance. The method in FIGS. 4 and 11 would function in the same way if the uplink LoRa frame sent by the endpoint 160A had been a frame containing a message intended for the LNS server 150 and the downlink LoRa frame a frame acknowledging the uplink LoRa frame.

Up until now, we have assumed that the meters 120A-E are strictly identical. Thus each meter 120A-E comprises an interface having a communication interface 114 and implements a LoRa gateway.

In one embodiment, all the meters 120A-E implement a LoRa gateway, but do not necessarily comprise a communication interface 114. A meter 120A-E may therefore implement a LoRa gateway without being capable of receiving or transmitting LoRa frames. For example, in this embodiment, the meter 120A does not comprise any communication interface 114 but implements a LoRa gateway, which enables it to execute in particular steps 405, 409, 410, 411, 412 and 1104.

In one embodiment, some meters do not comprise any communication interface 114 and do not implement a LoRa gateway. These meters may then be intermediate meters between two meters implementing a LoRa gateway. These meters then merely relay G3-PLC frames without being concerned with the content of these frames.

When the communication system comprises a plurality of data concentrators 110, it is possible that the FNS system 130 may receive a plurality of HTTP frames encapsulating the same uplink LoRa frame from a plurality of different data concentrators 110. In this case, the subparts 52 of each HTTP frame received contain information representing different sets of meters that have directly received the uplink LoRa frame. It can in fact be imagined that an uplink LoRa frame sent by the endpoint 160A is received by the meters 120B, 120C and 120D but that the meters 120B and 120C are attached to a first data concentrator 110 whereas the meter 120D is attached to a second data concentrator 110.

In this case, the processing module 30 of the FNS system 130 chooses an uplink LoRa frame encapsulated in the subpart 51 of one of the HTTP frames received during step 415.

In one embodiment, the uplink LoRa frame to be relayed to the LNS server 150 is for example the one included in the subpart 51 of the HTTP frame received first by the FNS system 130. In this embodiment, the processing module 30 of the FNS system 130 chooses the meter appearing first among the meters having an identifier in the subpart 52 of the HTTP frame received first during step 415.

In one embodiment, the uplink LoRa frame to be relayed to the LNS server 150 is for example chosen randomly. In this embodiment, the processing module 30 of the FNS system 130 also chooses randomly a meter among the meters having an identifier in the subpart 52 of one of the HTTP frames received first during step 415.

In another embodiment, the uplink LoRa frame to be relayed is the one included in the HTTP frame comprising, in its subpart 52, the best reception quality information. This embodiment amounts to choosing the uplink LoRa frame received with the best quality of reception by a meter. In this embodiment, the processing module 30 of the FNS system 130 also chooses the meter associated with the best information representing quality.

In one embodiment, the choice of the meter designated by the LNS server 150 may be called into question by the FNS system 130. This embodiment may for example be applied when the subpart 52 of the HTTP frame received by the FNS system 130 comprises a plurality of meter identifiers, each meter identifier being associated with information representing quality of reception of the uplink LoRa frame, but the processing module 30 of the FNS system 130 has not chosen the identifier of the meter that is to figure in the HTTP frame intended for the LNS server 150 on the basis of said information representing a reception quality. In this case, the identifier of the meter figuring in the HTTP frame received by the LNS server 150 is not necessarily the identifier of the meter that received the uplink LoRa frame with the best quality. It is however this meter that is chosen by the processing module 30 of the LNS server 150 since only its identifier figures in the HTTP frame received by the LNS server 150. This case may arise when the FNS system 130 relays the uplink LoRa frame as quickly as possible to the LNS server 150 without waiting until it has analysed the quality information contained in the subpart 52. In this embodiment, during step 1102, the processing module 30 of the FNS system 130 determines the meter identifier corresponding to the best information representing a reception quality and inserts the identifier determined in the subpart 92 rather than the meter identifier figuring in the subpart 82 included in the HTTP frame received from the LNS server 150.

The invention claimed is:

1. A retransmission network device for exchanging first frames, referred to as LPWAN frames, between an endpoint and a server, said endpoint being configured to exchange LPWAN frames with at least one gateway, referred to as an LPWAN gateway, by means of a first low power long range wireless network, and the server being configured to exchange LPWAN frames with LPWAN gateways, each LPWAN frame exchanged between the endpoint and the server having to pass through at least one meter and a data concentrator included in a second powerline communication network and forming a system for the automatic management of readings from a plurality of electricity meters, referred to as an AMM system, at least one meter in said AMM system implementing an LPWAN gateway and comprising a communication interface enabling it to exchange LPWAN frames with said endpoint by means of the first network, wherein the retransmission network device is connected to each data concentrator by means of a third network and to the server by means of a fourth network, and in that each LPWAN frame exchanged between said endpoint and the server passes through the device, each LPWAN frame exchanged between the retransmission network device and the server is encapsulated in a second frame in accordance with a frame format that the server would exchange with an LPWAN gateway, and, when an LPWAN frame sent by the endpoint is received directly by a plurality of meters and by a plurality of data concentrators in the second network so that the retransmission network device receives a plurality of copies of the LPWAN frame, the retransmission network device comprises:
a processing module configured to transmit a single copy of the LPWAN frame to the server, said LPWAN frame being associated in the second frame with information representative of one of the meters that directly received the LPWAN frame, chosen by the retransmission network device in accordance with a predetermined criterion, the processing module of the network retransmission device comprising a set of communication interfaces and being implemented in software form or being implemented in hardware form by a machine or a dedicated component.

2. A communication system comprising an endpoint and a server, said endpoint being configured to exchange LPWAN frames with at least one gateway, referred to as an LPWAN gateway, by means of a first low power long range wireless network, and the server being configured to exchange LPWAN frames with LPWAN gateways, each frame exchanged between the endpoint and the server having to pass through a meter and a data concentrator included in a second power line communication network of a system for the automatic management of readings from a plurality of electricity meters, referred to as meters, said meters in the plurality of meters being attached to at least one data concentrator via the second network, at least one meter in the plurality of meters implementing an LPWAN gateway and comprising a communication interface enabling it to exchange LPWAN frames with said endpoint by means of the first network, wherein the system comprises a retransmission network device according to claim 1.

3. A method for exchanging first frames, referred to as LPWAN frames, between an endpoint and a server, said endpoint being configured to exchange LPWAN frames with at least one gateway, referred to as an LPWAN gateway, by means of a first low power long range wireless network, and the server being configured to exchange LPWAN frames with LPWAN gateways, each LPWAN frame exchanged between the endpoint and the server having to pass through at least one meter and a data concentrator connected together by a second powerline communication network and forming a system for the automatic management of readings from a plurality of electricity meters, at least one meter implementing an LPWAN gateway and comprising a communication interface enabling it to exchange LPWAN frames with said endpoint by means of the first network, wherein:
the method is executed by an intermediate retransmission network device connected to each data concentrator by means of a third network and to the server by means of a fourth network so that each LPWAN frame exchanged between said endpoint and the server passes through the intermediate retransmission network device, each LPWAN frame exchanged between the intermediate retransmission network device and the server being encapsulated in a second frame in accordance with a frame format that the server would exchange with an LPWAN gateway, and comprises:
receiving a plurality of copies of the same LPWAN frame sent by the endpoint from a plurality of data concentrators, the LPWAN frame having been received directly by a plurality of meters; and
transmitting a single copy of the LPWAN frame to the server, said LPWAN frame being associated in the second frame with information representative of one of the meters that directly received the LPWAN frame, chosen by the intermediate retransmission network device in accordance with a predetermined criterion.

4. A method according to claim 3, wherein the predetermined criterion consists of choosing the first copy of the LPWAN frame received or randomly a copy of the LPWAN frame or a copy of the LPWAN frame received with the best quality by a meter in the second network.

5. A method according to claim 3, wherein, when, following the transmission of an LPWAN frame to the server, the LPWAN frame having been received directly by a plurality of meters, the intermediate retransmission network device receives a response frame intended for the endpoint from the server, the server having inserted in the response frame an identifier of a meter chosen by the server for relaying said response frame to the endpoint, the method comprises:
determining the meter in the plurality of meters that received the LPWAN frame with the best quality; and
inserting an identifier of the meter determined in the response frame in place of the identifier inserted by the server.

6. A method according to claim 3, wherein each LPWAN frame included in a second frame is encapsulated to the JSON format.

7. A non transitory storage medium having stored thereon a computer program, the computer program comprising instructions for the implementation, by a device, of the method according to claim 3 when said program is executed by a processor of said device.

\* \* \* \* \*